(12) United States Patent
Nieminen et al.

(10) Patent No.: US 8,923,303 B2
(45) Date of Patent: Dec. 30, 2014

(54) METHOD, SYSTEM AND INSTALLATION FOR FORWARDING DATA TRANSMISSION FRAMES

(75) Inventors: Juha-Petteri Nieminen, Espoo (FI); Mika Silvola, Kempele (FI); Mikko Laulainen, Helsinki (FI)

(73) Assignee: Tellabs Oy, Espoo (FI)

( * ) Notice: Subject to any disclaimer, the term of this patent is extended or adjusted under 35 U.S.C. 154(b) by 1043 days.

(21) Appl. No.: 12/687,403

(22) Filed: Jan. 14, 2010

(65) Prior Publication Data

US 2010/0177702 A1 Jul. 15, 2010

(30) Foreign Application Priority Data

Jan. 14, 2009 (FI) ..................................... 20095023

(51) Int. Cl.
*H04L 12/28* (2006.01)
*H04L 12/42* (2006.01)

(52) U.S. Cl.
CPC ...................................... *H04L 12/42* (2013.01)
USPC ...................................... 370/395.53; 370/335

(58) Field of Classification Search
USPC ................. 370/235, 249, 255, 338, 392, 397, 370/395.53, 399, 389, 401
See application file for complete search history.

(56) References Cited

U.S. PATENT DOCUMENTS

| | | | |
|---|---|---|---|
| 7,206,856 B1 | 4/2007 | Murphy et al. | |
| 2003/0142679 A1* | 7/2003 | Okagawa et al. | 370/397 |
| 2004/0100954 A1* | 5/2004 | Dai et al. | 370/389 |
| 2004/0131354 A1* | 7/2004 | Kim et al. | 398/3 |
| 2004/0133619 A1* | 7/2004 | Zelig et al. | 709/200 |
| 2005/0086367 A1* | 4/2005 | Conta et al. | 709/238 |
| 2007/0213060 A1* | 9/2007 | Shaheen | 455/436 |
| 2007/0248064 A1* | 10/2007 | Shaheen | 370/338 |
| 2008/0013553 A1* | 1/2008 | Shaheen | 370/401 |
| 2008/0031159 A1* | 2/2008 | Jokinen | 370/255 |

(Continued)

FOREIGN PATENT DOCUMENTS

| | | |
|---|---|---|
| CN | 1719804 A | 1/2006 |
| CN | 101009907 A | 8/2007 |

(Continued)

OTHER PUBLICATIONS

European Search Report in Corresponding Application No. EP 09 18 0928 Dated Mar. 9, 2010.

(Continued)

*Primary Examiner* — Hassan Phillips
*Assistant Examiner* — Ajay Cattungal
(74) *Attorney, Agent, or Firm* — Young & Thompson (57) ABSTRACT

In a system, the functionality is decentralized in a data transmission network so that the need of communications produced by and addressed to data terminals to pass by way of a single point in the data transmission network is diminished. A first data transmission installation is adapted to signal second data transmission installations, each of which is part of a ring-shaped data transmission topology, to be capable of building logical data transmission tunnels directed to the data terminals. Thereby, all the logical data transmission tunnels need not commence or, depending on the direction, terminate at the same point of a data transmission network. In addition, the data transmission installations present in a ring-shaped data transmission topology need not necessarily be taught routing information in order to enable each of these data transmission installations to send data transmission frames to be transmitted to another one of these data transmission installations.

37 Claims, 7 Drawing Sheets

(56) References Cited

U.S. PATENT DOCUMENTS

2008/0219166 A1* 9/2008 Ogasahara ................ 370/235
2009/0316588 A1* 12/2009 Nakamura ................ 370/249
2010/0020798 A1* 1/2010 Jones ........................ 370/392

FOREIGN PATENT DOCUMENTS

| CN | 101039507 A | 9/2007 |
|---|---|---|
| CN | 101227368 A | 7/2008 |
| CN | 101499950 A | 8/2009 |
| EP | 1 830 523 | 9/2007 |
| WO | 99/63710 A1 | 12/1999 |
| WO | 01/06707 | 1/2001 |
| WO | 01/86863 | 11/2001 |

OTHER PUBLICATIONS

Finnish Search Report dated Nov. 2, 2009, from corresponding Finnish application.
Chinese Search Report, dated May 20, 2013, from corresponding CN application.
Chinese Office Action, dated Jan. 23, 2014, from corresponding CN application.

* cited by examiner

METHOD, SYSTEM AND INSTALLATION FOR FORWARDING DATA TRANSMISSION FRAMES

FIELD OF THE INVENTION

The invention relates to a data transmission installation for forwarding data transmission frames. The invention relates also to a data transmission installation for controlling the forwarding of data transmission frames. The invention relates also to a method for forwarding data transmission frames. The invention relates also to a method for controlling the forwarding of data transmission frames. The invention relates also to a computer program for forwarding data transmission frames. The invention relates also to a system for forwarding data transmission frames.

BACKGROUND OF THE INVENTION

Figure 1:
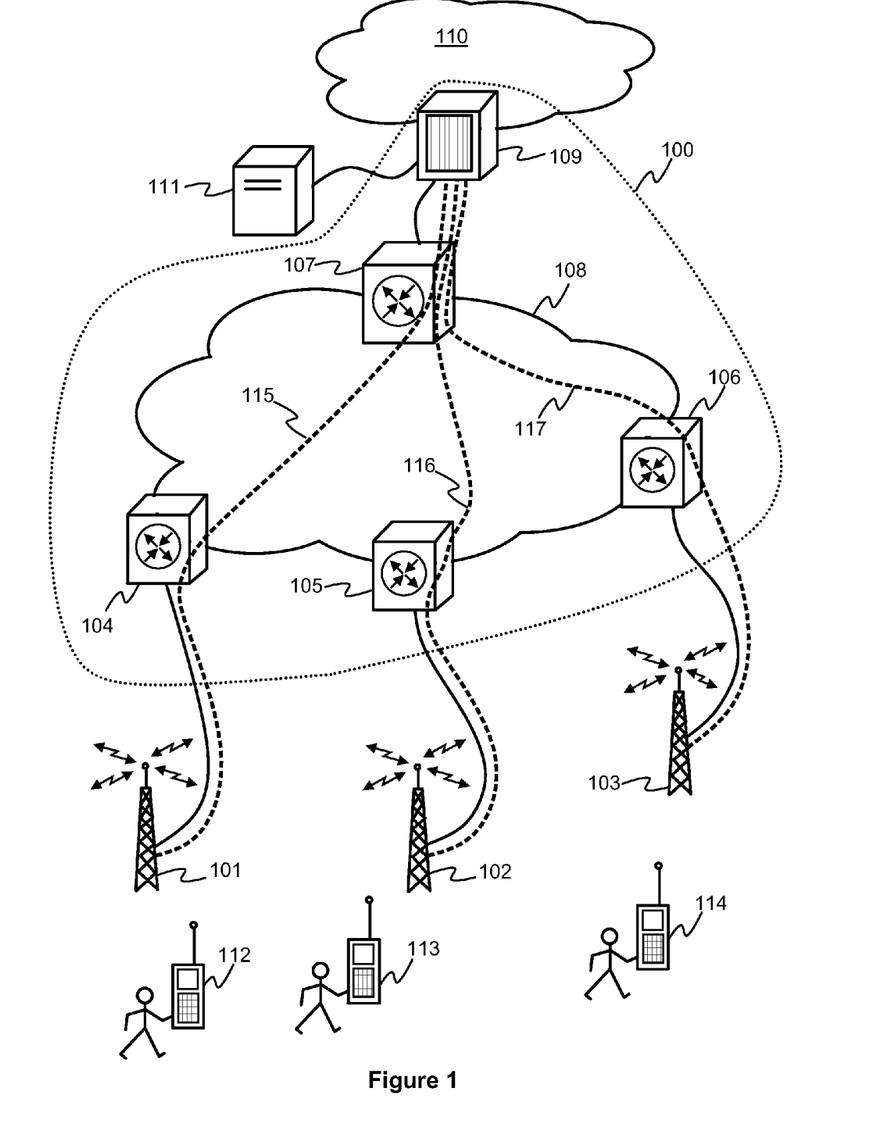
FIG. 1 shows a system according to the prior art for forwarding data transmission frames.

FIG. 1 shows a system 100 according to the prior art, which enables linking with mobile telephone network base stations 101, 102 and 103. The system comprises data transmission installations 104, 105, 106 and 107, which can be for example IP (Internet Protocol) routers, MPLS (Multiprotocol Label Switching) switches and/or Ethernet switches. Each data transmission installation can be a single device or a combination of several interconnected devices. Said data transmission installations are connected to each other over a local data transmission network 108. The data transmission network 108 comprises other data transmission installations and data transmission links therebetween. The system includes a gateway device 109, providing a link to a data transmission core network 110, a representative of which can be for example the global Internet. The gateway device 109 is connected over the data transmission installation 107 to the local data transmission network 108. The system 100 is in communication with a mobility management entity MME 111, which is adapted to maintain an up-to-date record for the locations of data terminals 112, 113 and 114 in a radio link network established by the base stations 101, 102 and 103. The mobility management entity 111 is connected to the gateway device 109 either directly or over a data transmission network. The mobility management entity 111 can also be incorporated in the gateway device 109. Each of the data terminals 112, 113 and 114 can be for example a mobile telephone or a palm computer.

The mobility management entity 111 is adapted, based on the locations of the data terminals 112, 113 and 114, to establish control data, on the basis of which the data transmission installations 104-107 and the gateway device 109 are able to create logical data transmission tunnels 115, 116 and 117 between the base stations 101, 102 and 103 and the gateway device 109. Said logical data transmission tunnels can be for example GTP-U (General Packet Radio Service Tunneling Protocol—User plane messages) data transmission tunnels, GRE (Generic Routing Encapsulation) data transmission tunnels, IPinIP (Internet Protocol in Internet Protocol) data transmission tunnels or data transmission tunnels implemented by Ethernet frames.

In the situation shown in FIG. 1, it is reasonable to assume, for example, that the data terminal 112 lies within a coverage range of the base station 101, the data terminal 113 lies within a coverage range of the base station 102, and the data terminal 114 lies within a coverage range of the base station 103. It is further reasonable to assume that the data terminal 112 has its communications transmitted in the logical data transmission tunnel 115, the data terminal 113 has its communications transmitted in the logical data transmission tunnel 116, and the data terminal 114 has its communications transmitted in the logical data transmission tunnel 117. In the event that for example the data terminal 112 passes from the coverage range of the base station 101 into the coverage range of the base station 102, the logical data transmission tunnel 115 will be cancelled and a corresponding new logical data transmission tunnel will be established between the gateway device 109 and the base station 102. A problem with the above-described type system 100 is that communications produced by data terminals and communications addressed thereto proceed by way of the gateway device 109. In other words, communications produced by data terminals and communications addressed thereto are forced to proceed by way of a single point in the data transmission network. As a result, the local data transmission network 108, the data transmission installation 107, and the gateway device 109 may be subjected to heavy loading, which calls for precautionary measures in the process of designing data transmission links and data transmission installations.

SUMMARY OF THE INVENTION

The invention relates to a new type of system, in which the functionality is decentralized in a data transmission network, such that there will be less need for communications produced by data terminals and communications addressed thereto to proceed by way of a single point in the data transmission network. The system of the invention comprises:
  a first data transmission installation, and
  second data transmission installations, each of which is part of a ring-shaped data transmission topology and said first data transmission installation is in data communication with at least one of said second data transmission installations.

Said first data transmission installation includes a processor unit, which is adapted to write control data into one or more first data transmission frames to be sent to said ring-shaped data transmission topology, which control data contains building and cancelling commands for logical data transmission tunnels determined on the basis of the mobility of data terminals connected to a data transmission network.

Each of said second data transmission installations includes a processor unit, which is adapted to:
  read said control data from said one or more first data transmission frames,
  execute building and cancelling actions determined by said control data for logical data transmission tunnels, and
  determine forwarding actions for a received second data transmission frame on the basis of forwarding control data contained in said second data transmission frame, said forwarding actions comprising one of the following: (i) a transmission of said second data transmission frame to said ring-shaped data transmission topology or (ii) a transmission of said second data transmission frame into a logical data transmission tunnel commencing from the relevant data transmission installation.

Communications produced by said data terminals and communications addressed thereto need not proceed by way of a single point in a data transmission network, because said first data transmission installation is adapted to signal each of said second data transmission installations to make it capable of building necessary logical data transmission tunnels, and said ring-shaped data transmission topology is capable of functioning as a traffic circle for communications produced by and addressed to the data terminals. Thus, said logical data transmission tunnels need not commence or, depending on the direction, terminate at the same point of a data transmission network as opposed to the prior art system shown in FIG. 1, in which all logical data transmission tunnels commence or terminate at the same point of a data transmission network, i.e. at the gateway device 109.

Said second data transmission installations need not necessarily be taught routing or other such information for enabling a specific second data transmission installation to control data transmission frames passing to another one of said second data transmission installations, because said second data transmission installations constitute part of a ring-shaped data transmission topology. In a system according to one embodiment of the invention, said second data transmission installations are taught the above-mentioned routing and other such information in order to make said second data transmission installations capable of selecting an optimal data transmission direction in said ring-shaped data transmission topology. However, said teaching is not time-critical.

The invention relates also to a new type of data transmission installation for forwarding data transmission frames. The data transmission installation of the invention encompasses data receivers for receiving data transmission frames in said data transmission installation, data transmitters for sending data transmission frames from said data transmission installation, and a processor unit which is adapted to:
    read control data from one or more received first data transmission frames, which control data contains building and cancelling commands for logical data transmission tunnels determined on the basis of the mobility of data terminals connected to a data transmission network,
    execute building and cancelling actions determined by said control data for logical data transmission tunnels, and
    determine forwarding actions for a received second data transmission frame on the basis of forwarding control data contained in said second data transmission frame, said forwarding actions comprising a transmission of said second data transmission frame by way of one of the following (i-iii): (i) a predetermined output port of said data transmission installation or (ii) one of two optional predetermined output ports of said data transmission installation or (iii) a logical data transmission tunnel commencing from said data transmission installation.

Said data transmission installation is preferably used as part of a ring-shaped data transmission topology. In the event that said ring-shaped data transmission topology operates on just one data transfer direction, either clockwise or counter-clockwise, a data transmission frame to be transmitted to some other corresponding data transmission installation is always sent by way of the same predetermined output port. In the event that said ring-shaped transmission topology operates on both data transfer directions, a data transmission frame to be transmitted to some other corresponding data transmission installation is sent by way of either one of two optional output ports, one output port corresponding to a clockwise data transfer direction and the other output port corresponding to a counter-clockwise data transfer direction.

The invention relates also to a new type of data transmission installation for controlling the forwarding of data transmission frames. The data transmission installation of the invention comprises data transmitters for sending data transmission frames from said data transmission installation, and a processor unit which is adapted to:
    write control data into one or more first data transmission frames to be sent to a second transmission installation, which control data contains building and cancelling commands for logical data transmission tunnels determined on the basis of the mobility of data terminals connected to a data transmission network, and
    write second control data into one or more second data transmission frames to be sent to said second data transmission installation, which control data contains location-related information, which is updated on the basis of the mobility of said data terminals and which enables selecting a data transfer direction in the ring-shaped data transmission topology, which direction, according to a predetermined criterion, is more favorable for passing a third data transmission frame, which is addressed to one of said data terminals, to the commencing point of a logical data transmission tunnel directed to this particular data terminal.

The invention relates also to a new type of method for forwarding data transmission frames, said method comprising:
    receiving one or more first data transmission frames in a data transmission installation,
    reading control data from said one or more first data transmission frames, which control data contains building and cancelling commands for logical data transmission tunnels determined on the basis of the mobility of data terminals connected to a data transmission network,
    executing building and cancelling actions determined by said control data for logical data transmission tunnels,
    determining forwarding actions for a received second data transmission frame on the basis of forwarding control data contained in said second data transmission frame, said forwarding actions comprising a transmission of said second data transmission frame by way of one of the following (i-iii): (i) a predetermined output port of a data transmission installation or (ii) one of two optional predetermined output ports of said data transmission installation or (iii) a logical data transmission tunnel commencing from said data transmission installation, and
    sending said second data transmission frame in compliance with the determined forwarding actions.

The invention relates also to a new type of method for controlling the forwarding of data transmission frames, said method comprising:
    writing control data into one or more first data transmission frames, which control data contains building and cancelling commands for logical data transmission tunnels determined on the basis of the mobility of data terminals connected to a data transmission network,
    sending said one or more first data transmission frames to a data transmission installation which is part of a ring-shaped data transmission topology,
    writing second control data into one or more second data transmission frames, which control data contains location-related information, which is updated on the basis of the mobility of said data terminals and which enables selecting a data transfer direction in the ring-shaped data transmission topology, which direction, according to a predetermined criterion, is more favorable for passing a third data transmission frame, which is addressed to one of said data terminals, to the commencing point of a logical data transmission tunnel directed to this particular data terminal, and
    sending said one or more second data transmission frames to said data transmission installation.

The invention relates also to a new type of computer program for forwarding data transmission frames. The computer program of the invention includes programmatic elements for controlling a programmable processor unit:
    to read control data from one or more first data transmission frames, which control data contains building and cancelling commands for logical data transmission tunnels determined on the basis of the mobility of data terminals connected to a data transmission network, to execute building and cancelling actions determined by said control data for logical data transmission tunnels, and to determine forwarding actions for a received second data transmission frame on the basis of forwarding control data contained in said second data transmission frame, said forwarding actions comprising a transmission of said second data transmission frame by way of one of the following (i-iii): (i) a predetermined output port of a data transmission installation or (ii) one of two optional predetermined output ports of said data transmission installation or (iii) a logical data transmission tunnel commencing from said data transmission installation.

The various embodiments of the invention are characterized by what is presented in the dependent claims.

BRIEF DESCRIPTION OF THE FIGURES

The following description deals with embodiments and benefits of the invention in more detail with reference to the exemplary embodiments and accompanying drawings, in which

FIG. 1 has been described earlier in this document in connection with the description of the prior art.

DESCRIPTION OF EMBODIMENTS OF THE INVENTION

Figure 2A:
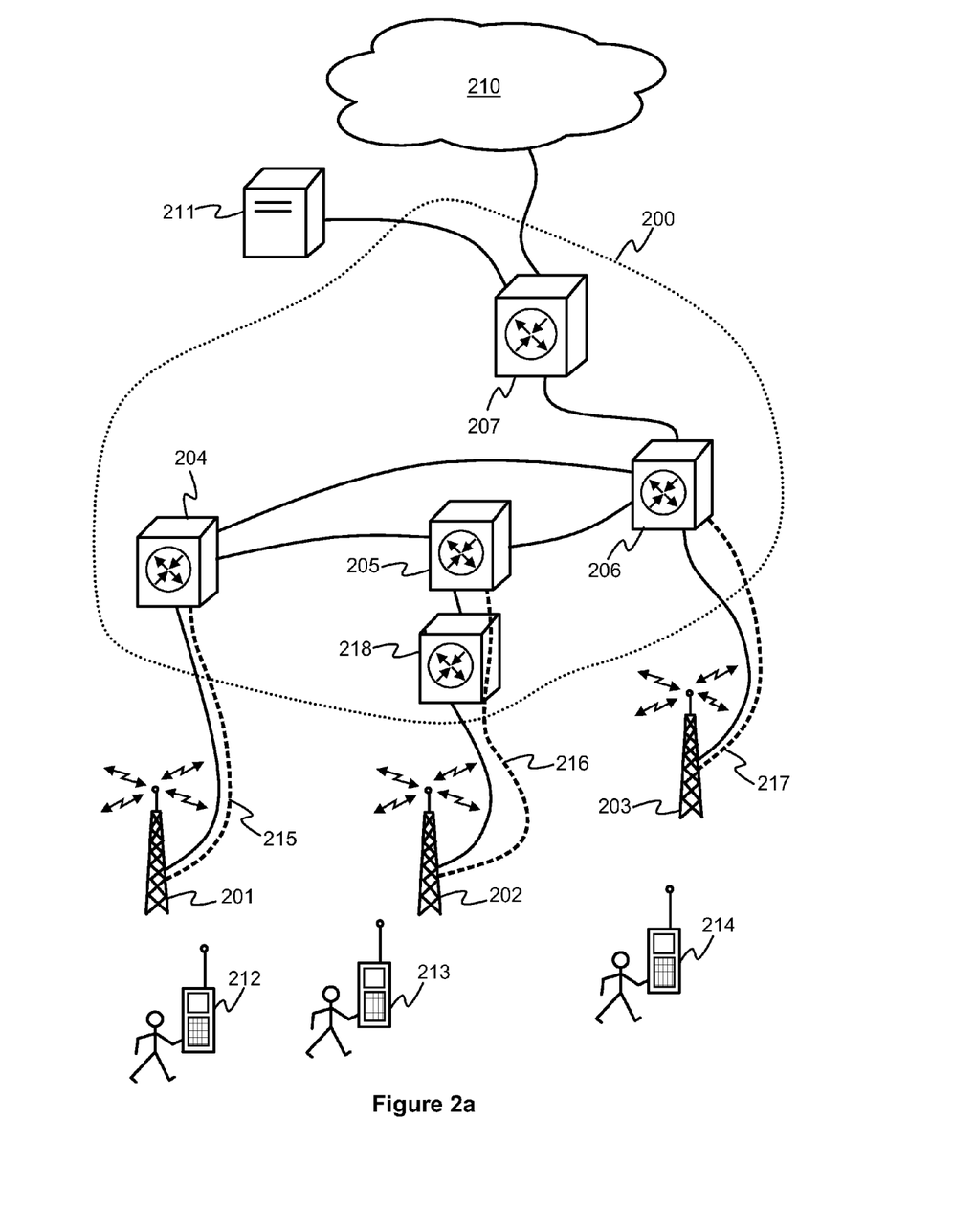
FIGS. 2a and 2b show systems according to certain embodiments of the invention for forwarding data transmission frames.

FIG. 2a shows a system 200 according to one embodiment of the invention, which enables linking with mobile telephone network base stations 201, 202 and 203. The system comprises a first data transmission installation 207 and second data transmission installations 204, 205 and 206. Said data transmission installations can be for example IP (Internet Protocol) routers, MPLS (Multiprotocol Label Switching) switches, and/or Ethernet switches. Each data transmission installation can be a single device or a combination of several interconnected devices. The data transmission installations 204, 205 and 206 make up a ring-shaped data transmission topology. The data transmission installation 207 is in data communication with at least one of said data transmission installations 204, 205 and 206. The system 200 is connected by way of the data transmission installation 207, or by way of some other data transmission installation which is in communication with the data transmission installation 207, to a data transmission core network 210, a representative of which can be for example the global Internet. The system 200 is in communication with a mobility management entity MME 211, which is adapted to maintain an up-to-date record for the locations of data terminals 212, 213 and 214 in a radio link network established by the base stations 201, 202 and 203. Each data terminal can be for example a mobile telephone or a palm computer. The mobility management entity 211 is connected to the data transmission installation 207 either directly or by way of some other data transmission installation. It is also possible that the mobility management entity 211 is incorporated in the data transmission installation 207.

The mobility management entity 211 is adapted, based on locations of the data terminals 212, 213 and 214, to establish control data on the basis of which logical data transmission tunnels 215, 216 and 217 can be created between the base stations 201, 202 and 203 and the data transmission installations 204, 205 and 206. Said logical data transmission tunnels can be for example GTP-U (General Packet Radio Service Tunneling Protocol—User plane messages) data transmission tunnels, GRE (Generic Routing Encapsulation) data transmission tunnels, IPinIP (Internet Protocol in Internet Protocol) data transmission tunnels, or data transmission tunnels implemented by Ethernet frames. Said logical data transmission tunnels comprise preferably both a downstream tunnel from the data transmission installation to the base station and an upstream tunnel from the base station to the data transmission installation. The GRE data transmission tunnel has been described for example in technical specification IETF RFC2784 (Internet Engineering Task Force—Request for Comments). The IPinIP data transmission tunnel has been described for example in technical specification IETF RFC2003, and the GTP-U data transmission tunnel has been described for example in technical specification 3GPP TS29.060 ($3^{rd}$ Generation Partnership Project, Technical Specification).

Data transmission between the data transmission installations 204, 205, 206, and 207 as well as the base stations 201, 202 and 203 can be implemented by using for example one or more of the following data transfer protocols:

IP (Internet Protocol), the addresses used therein being selectable for example from the public IP address space, Ethernet, IP VPN (Internet Protocol, Virtual Private Network), and/or VPLS (Virtual Private LAN Service, LAN=Local Area Network).

The IP VPN and VPLS protocols enable defining parallel virtual data transmission networks in the system 200. For example, data transmission frames produced by and addressed to the data terminals of corporate subscribers can be carried by a virtual data transmission network A and data transmission frames produced by and addressed to the data terminals of private subscribers can be carried by another virtual data transmission network B. It is also possible to use separate virtual transmission networks for data transmission frames produced by and addressed to the data terminals of various subscribers according to charges paid by said subscribers. IP VPN has been described for example in technical specification IETF RFC4364 and VPLS has been described for example in technical specification IETF RFC4762.

Data transmission between the data transmission installations 204, 205, 206 and 207 as well as the base stations 201, 202 and 203 can also be implemented by using logical data transmission tunnels such as GTP-U (General Packet Radio Service—User plane messages) data transmission tunnels, GRE (Generic Routing Encapsulation) data transmission tunnels, IPinIP (Internet Protocol in Internet Protocol) data transmission tunnels, and/or data transmission tunnels established by Ethernet frames.

The data transmission installation 207 comprises data transmitters for sending data transmission frames to a ring-shaped data transmission topology established by the data transmission installations 204, 205 and 206. The data transmission frames can be for example IPv4 packets, IPv6 (Internet Protocol) packets, or Ethernet frames. The data transmission installation 207 includes a processor unit, which is adapted to write control data CD into one or more first transmission frames F1 to be sent, which control data contains building and cancelling commands for the logical data transmission tunnels 215, 216 and 217, determined on the basis of mobility of the data terminals 212, 213 and 214. Said control data CD is based on information received by the data transmission installation 207 from the mobility management entity 211.

Each of the data transmission installations 204, 205 and 206 includes data receivers for receiving data transmission frames, and data transmitters for sending data transmission frames. Each of the data transmission installations 204, 205 and 206 is provided with a processor unit, which is adapted to:
  read said control data CD from said one or more received first data transmission frames F1,
  execute building and cancelling actions determined by said control data for logical data transmission tunnels, and
  determine forwarding actions for a received second data transmission frame F2 on the basis of forwarding control data contained in said second data transmission frame, said forwarding actions comprising one of the following: (i) a transmission of said second data transmission frame to a ring-shaped data transmission topology established by the data transmission devices 204, 205 and 206 or (ii) a transmission of said second data transmission frame into a logical data transmission tunnel commencing from the relevant data transmission installation.

The above-mentioned data transmission frames F1 and F2 can be for example IP (Internet Protocol) packets or Ethernet frames. The IP packets can be either IPv4 or IPv6 packets (Internet Protocol—version 4, Internet Protocol—version 6).

The forwarding control data contained in a data transmission frame can be for example an IP destination address or an Ethernet destination address. In addition, the forwarding control data may contain a piece of information indicating a CoS (Class of Service) applicable to a data transmission frame, or a piece of information indicating a virtual data transmission network used for a data transmission frame.

In the situation shown in FIG. 2a, it is reasonable to assume, for example, that the data terminal 212 lies within a coverage range of the base station 201, the data terminal 213 lies within a coverage range of the base station 202, and the data terminal 214 lies within a coverage range of the base station 203. It is further presumed that the data terminal 212 produces a data transmission frame addressed to the data terminal 213. Thus, the data transmission installation 204 receives said data transmission frame from the logical data transmission tunnel 215 and sends said data transmission frame to a ring-shaped data transmission topology established by the data transmission devices 204, 205 and 206. Said data transmission frame ends up in the data transmission installation 205 either directly or by way of the data transmission installation 206, depending on which data transfer direction the data transmission installation 204 is adapted to choose for sending said data transmission frame. On the basis of said control data CD and said data transmission frame forwarding control data, the data transmission installation 205 is adapted to notice that said data transmission frame is addressed to such a data terminal, which has a logical data transmission tunnel directed thereto commencing from this particular data transmission installation 205. Thereafter, the data transmission installation 205 sends said data transmission frame in the logical data transmission tunnel 216 to the base station 202 and to be forwarded from there to the data terminal 213. In other words, the data transmission installation 205 sends said data transmission frame into the logical data transmission tunnel 216, which provides access to the data terminal 213. The forwarding control data included in the data transmission frame may contain for example an IP destination address.

Communications produced by the data terminals 212, 213 and 214 and communications addressed thereto need not pass by way of a single point in a data transmission network, because the data transmission installation 207 is adapted to signal each of the data transmission installations 204, 205 and 206 to make it capable of creating necessary logical data transmission tunnels, and the ring-shaped data transmission topology established by the data transmission installations 204, 205 and 206 is capable of functioning as a traffic circle for communications produced by and addressed to the data terminals 212, 213 and 214. As a result, the logical data transmission tunnels need not commence, or depending on the direction, need not terminate at the same point of a data transmission network as opposed to the prior art system shown in FIG. 1, in which all logical data transmission tunnels commence or terminate at the same point of a data transmission network, i.e. at the gateway device 109. The data transmission installations 204, 205 and 206 need not necessarily be taught routing and other such information in order to enable each of these data transmission installations 204, 205 and 206 to send data transmission frames to be delivered to any other of said data transmission installations 204, 205 and 206, because said data transmission installations 204, 205 and 206 make up a ring-shaped data transmission topology.

In a system according to one embodiment of the invention, one or more of the data transmission installations 204, 205 and 206 is/are taught routing or other relevant information for making said data transmission installations capable of selecting an optimal data transfer direction in a ring-shaped data transmission topology established by the data transmission installations 204, 205 and 206. However, the discussed teaching is not time-critical.

In a system according to one embodiment of the invention, the data transmission installation 207 has its processor unit adapted to write second control data CD2 into one or more data transmission frames, which is/are sent to a ring-shaped data transmission topology established by the data transmission installations 204, 205 and 206. Said second control data CD2 contains location-related information updated on the basis of the mobility of the data terminals 212, 213 and 214. Each of the data transmission installations 204, 205 and 206 has its processor unit adapted to read said second control data CD2 from said one or more data transmission frames and to select a data transfer direction in said ring-shaped data transmission topology on the basis of said second control data CD2 and the forwarding control data contained in a data transmission frame to be sent. Accordingly, each of the data transmission installations 204, 205 and 206 is capable of choosing an optimal data transfer direction, which can be clockwise or counter-clockwise, in said ring-shaped data transmission topology. In the above-presented example, in which the data terminal 212 sends a data transmission frame addressed to the data terminal 213, the data transmission installation 204 is able to send said data transmission frame directly to the data transmission installation 205 on the basis of said second control data CD2 and the forwarding control data contained in said data transmission frame. Said second control data CD2 may contain for example an IP or Ethernet forwarding table or updates for one or both of said forwarding tables, which enables/enable the determination of an optimal data transfer direction in said ring-shaped data transmission topology, for example on the basis of an IP or Ethernet destination address, DA.

In a system according to one embodiment of the invention, each of the data transmission installations 204, 205 and 206 has its processor unit adapted to write control data into one or more data transmission frames to be sent to said ring-shaped data transmission topology, which control data is adapted to indicate one or more data terminals with a logical data transmission tunnel directed thereto commencing from the relevant data transmission installation 204, 205 or 206. Each of the data transmission installations 204, 205 and 206 has its processor unit adapted to read said control data from one or more data transmission frames and to choose a data transfer direction in said ring-shaped data transmission topology on the basis of said control data and the forwarding control data contained in a data transmission frame to be sent. Thereby, each of the data transmission installations 204, 205 and 206 is capable of selecting an optimal data transfer direction, which can be clockwise or counter-clockwise, in said ring-shaped data transmission topology.

In a system according to one embodiment of the invention, each of the data transmission installations 204, 205 and 206 has its processor unit adapted to select a data transfer direction on the basis of the forwarding control data contained in a data transmission frame to be transmitted in said ring-shaped data transmission topology, and on the basis of one or more predetermined conditions relevant to said forwarding control data. Said predetermined condition may, for example, disclose the data transfer direction on the basis of knowing which data terminal a data transmission frame to be sent is addressed to. Said predetermined condition may have been created for example on the basis of which base station's coverage range is the most likely location for a given data terminal. In the event that for example the data terminal 213 is most likely located within a coverage range of the base station 202, said predetermined condition in the data transmission installation 204 can be as follows: the data transfer direction is counter-clockwise in case the data transmission frame is addressed to the data terminal 213. In the data transmission installation 206, respectively, the predetermined condition can be as follows: the data transfer direction is clockwise in case the data transmission frame is addressed to the data terminal 213. The predetermined conditions applied in one or more data transmission installations 204, 205 and 206 may also be time-dependent, in case it is known, for example, that, during a specific time period, a specific data terminal is most likely located within the coverage range of a specific base station and, during some other time period, within the coverage range of some other base station.

In a system according to one embodiment of the invention, each of the data transmission installations 204, 205 and 206 has its processor unit adapted to choose a data transfer direction in said ring-shaped data transmission topology primarily on the basis of control data, which has been updated on the basis of the mobility of data terminals, and on the basis of forwarding control data for a data transmission frame to be sent, and secondarily on the basis of said forwarding control data and one or more predetermined conditions relevant to said forwarding control data. Therefore, in the situation that said control data does not exist, or it is irrelevant because said control data is outdated, the data transfer direction can be chosen for example on the basis of which base station's coverage range is the most likely location for this particular data terminal.

Figure 2B:
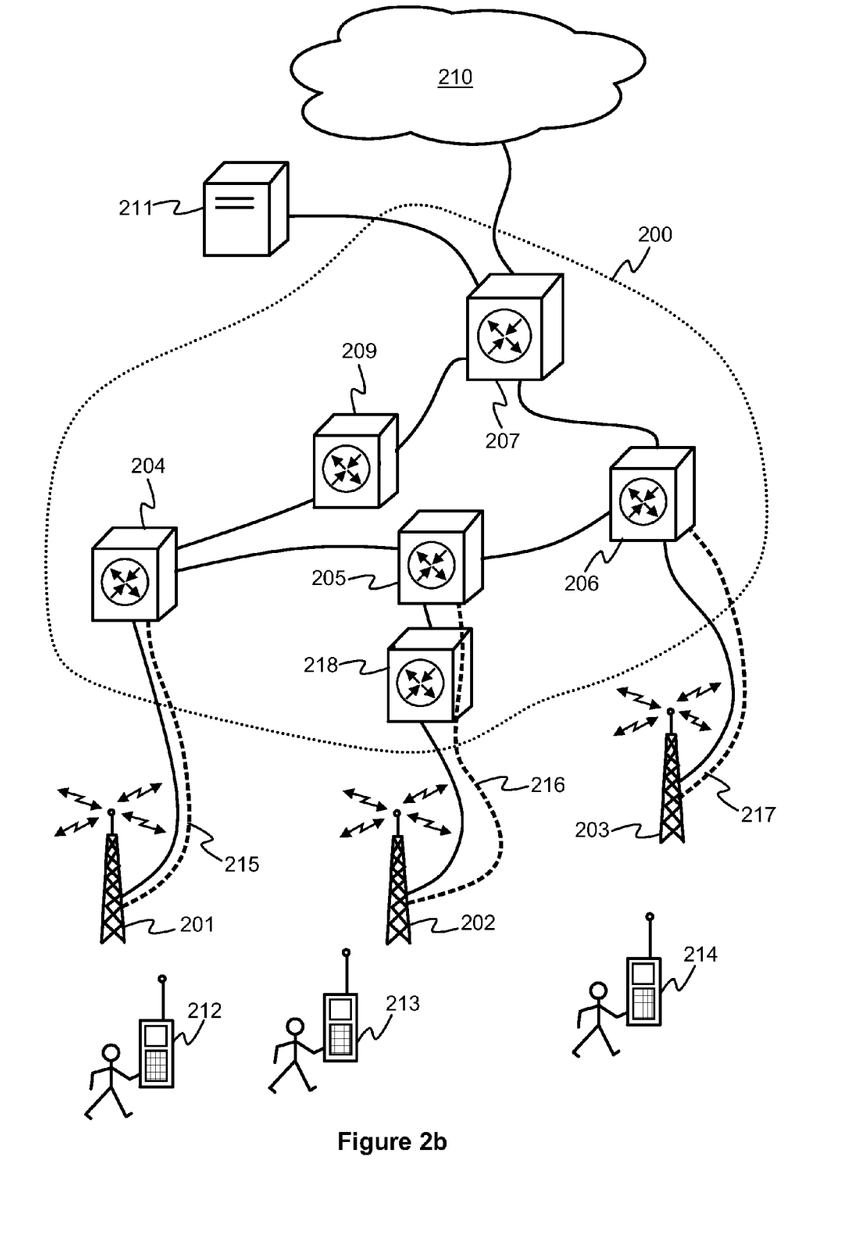

FIG. 2b shows a system 200 according to one embodiment of the invention, which enables linking with mobile phone network base stations 201, 202 and 203. The system shown in FIG. 2b is otherwise similar to that shown in FIG. 2a except that the ring-shaped data transmission topology comprises also data transmission installations 209 and 207 other than just those data transmission installations 204, 205 and 206 providing access to the base stations 201, 202 and 203.

In the systems 200 shown in FIGS. 2a and 2b, the data transmission installations 204 and 206 are connected by way of data transmission links directly to the base stations 201 and 203, and the data transmission installation 205 is connected to the base station 202 by way of a data transmission installation 218. The data transmission installation 218 is preferably adapted to forward data transmission frames to be carried in a logical data transmission tunnel 216 without terminating said logical data transmission tunnel.

Figure 3:
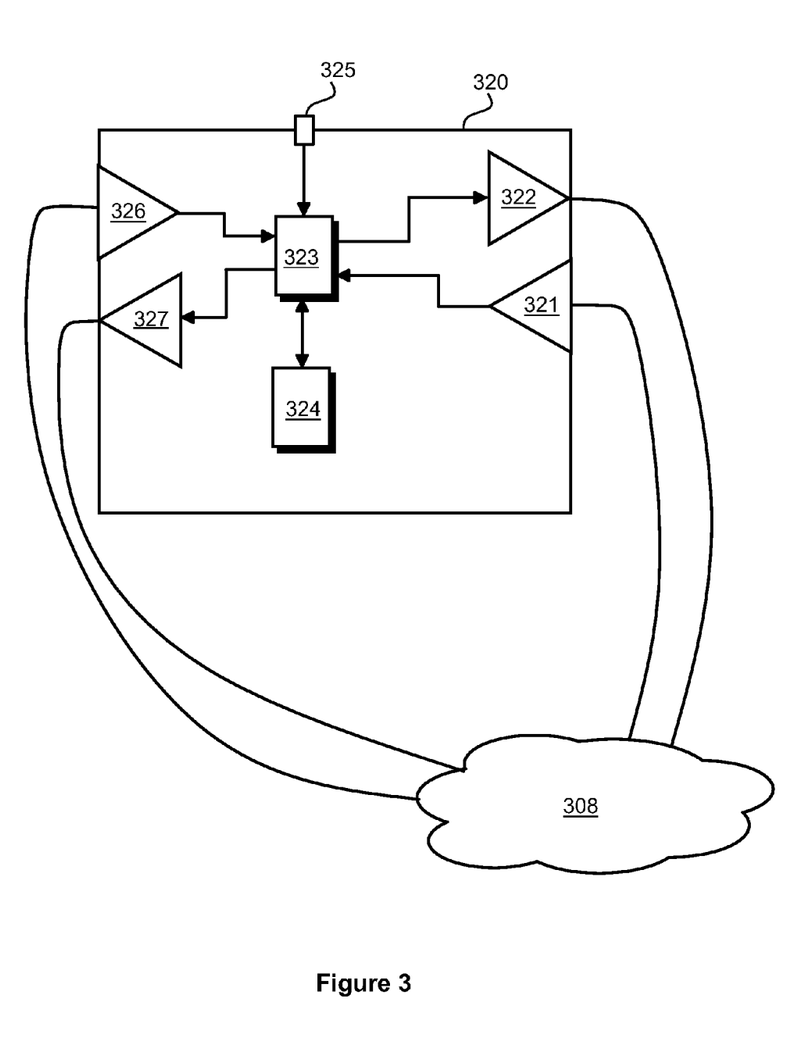
FIG. 3 shows a data transmission installation according to one embodiment of the invention for forwarding data transmission frames.

FIG. 3 shows a data transmission installation 320 according to one embodiment of the invention for forwarding data transmission frames. The data transmission installation can be for example an IP (Internet Protocol) router, an MPLS (Multiprotocol Label Switching) switch, and/or an Ethernet switch. The data transmission installation includes data receivers 321 and 326 for receiving data transmission frames from a data transmission network 308, and data transmitters 322 and 327 for sending data transmission frames to said data transmission network. The data transmission frames can be for example IPv4 packets, IPv6 packets (IP=Internet Protocol), or Ethernet frames.

The data transmission installation includes a processor unit 323, which is adapted to:
- read control data CD from one or more first data transmission frames received from said data transmission network, which control data contains building and cancelling commands for logical data transmission tunnels determined on the basis of the mobility of data terminals connected to said data transmission network,
- execute building and cancelling actions determined by said control data CD for logical data transmission tunnels, and
- determine forwarding actions for a received second data transmission frame on the basis of forwarding control data contained in said second data transmission frame, said forwarding actions comprising a transmission of said second data transmission frame to said data transmission network by way of one of the following (i-iii): (i) a predetermined output port of said data transmission installation or (ii) one of two optional predetermined output ports of said data transmission installation or (iii) a logical data transmission tunnel commencing from said data transmission installation.

The data transmission installation may also include a data storage 324 and/or a connecting interface 325 for linking with an external data storage. The processor unit 323 may consist of one or several processors, each of which can be for example a programmable processor, an application specific integrated circuit ASIC, a field programmable gate array FPGA, or a combination of one or more of the above.

The data transmission installation 320 is preferably used as part of a ring-shaped data transmission topology. The data transmission installation 320 can be for example any of the data transmission installations 204, 205 and 206 shown in FIGS. 2a and 2b. In the event that said ring-shaped data transmission topology only operates on a single data transfer direction, either clockwise or counter-clockwise, a data transmission frame to be sent to some other corresponding data transmission installation will be transmitted by way of a specific predetermined output port. Said predetermined output port can be implemented for example by means of the data transmitters 322. In the event that said ring-shaped data transmission topology operates on both data transfer directions, a data transmission frame to be sent to some other corresponding data transmission installation will be transmitted by way of either one of two optional output ports, one output port corresponding to a clockwise data transfer direction and the other output port corresponding to a counter-clockwise data transfer direction. One of said two optional predetermined output ports can be implemented by means of the data transmitters 322 and the other of said two optional predetermined output ports can be implemented by means of the data transmitters 327.

In a data transmission installation according to one embodiment of the invention, the processor unit 323 is adapted to read second control data CD2 from one or more data transmission frames received from said data transmission network, and to select one of said two optional predetermined output ports on the basis of said second control data CD2 and the forwarding control data contained in a data transmission frame to be sent. Thereby, the data transmission installation 320 is capable of choosing an optimal data transfer direction, which can be clockwise or counter-clockwise in said ring-shaped data transmission topology. Said second control data CD2 may contain for example an IP or Ethernet forwarding table or updates for one or both of said forwarding tables (IP forwarding table, Ethernet forwarding table), which enables/enable determining an optimal data transfer direction in said ring-shaped data transmission topology for example on the basis of an IP or Ethernet destination address DA.

In a data transmission installation according to one embodiment of the invention, the processor unit 323 is adapted to select one of said two optional predetermined output ports on the basis of forwarding control data contained in a data transmission frame to be sent and on the basis of one or more predetermined conditions regarding said forwarding control data. Said predetermined condition can be created for example on the basis of which base station's coverage range is the most likely location for a specific data terminal.

In a data transmission installation according to one embodiment of the invention, the processor unit 323 is adapted to read second control data CD2 from one or more data transmission frames received from said data transmission network, and to primarily choose one of said two optional predetermined output ports on the basis of said second control data CD2 and the forwarding control data contained in a data transmission frame to be sent, and to secondarily choose the other of said two optional predetermined output ports on the basis of said forwarding control data and one or more predetermined conditions relevant to said forwarding control data. Thus, in the situation in which said second control data CD2 does not exist, or it is irrelevant because said second control data CD2 is outdated, the data transfer direction can be chosen for example on the basis of which base station's coverage range is the most likely location for this particular data terminal.

In the data transmission installation 320 according to one embodiment of the invention, the processor unit 323 is adapted to write control data into one or more data transmission frames to be sent to said data transmission network 308, which control data is adapted to indicate one or more data terminals with a logical data transmission tunnel directed thereto commencing from the discussed data transmission installation 320. A second corresponding data transmission installation, present in said ring-shaped data transmission topology, is capable of selecting an optimal data transfer direction on the basis of said control data and the forwarding control data for a data transmission frame to be sent.

In a data transmission installation according to one embodiment of the invention, the processor unit 323 is adapted to support GTP-U data transmission tunnels. In this case, said data transmission tunnels are preferably GTP-U (General Packet Radio Service Tunneling Protocol—User plane messages) data transmission tunnels.

In a data transmission installation according to one embodiment of the invention, the processor unit 323 is adapted to support GRE data transmission tunnels. In this case, said data transmission tunnels are preferably GRE (Generic Routing Encapsulation) data transmission tunnels.

In a data transmission installation according to one embodiment of the invention, the processor unit 323 is adapted to support data transmission tunnels implemented by means of Ethernet frames. In this case, said data transmission tunnels are preferably implemented by means of Ethernet frames.

In a data transmission installation according to one embodiment of the invention, the processor unit 323 is adapted to support IPinIP data transmission tunnels. In this case, said data transmission tunnels are preferably IPinIP (Internet Protocol in Internet Protocol) data transmission tunnels.

In a data transmission installation according to one embodiment of the invention, the processor unit 323 is adapted to use an IP destination address, contained in an IP (Internet Protocol) packet, at least as a part of the forwarding control data relevant to said IP packet.

In a data transmission installation according to one embodiment of the invention, the processor unit 323 is adapted to use an Ethernet destination address, contained in an Ethernet frame, at least as a part of the forwarding control data relevant to said Ethernet frame.

In a data transmission installation according to one embodiment of the invention, the processor unit 323 is adapted to select, on the basis of data transmission frame forwarding control data, one of the virtual data transmission networks predefined in the data transmission network 308. Each virtual data transmission network can be for example an IP VPN (Internet Protocol, Virtual Private Network) virtual data transmission network or a VPLS (Virtual Private LAN Service) virtual data transmission network.

Figure 4:
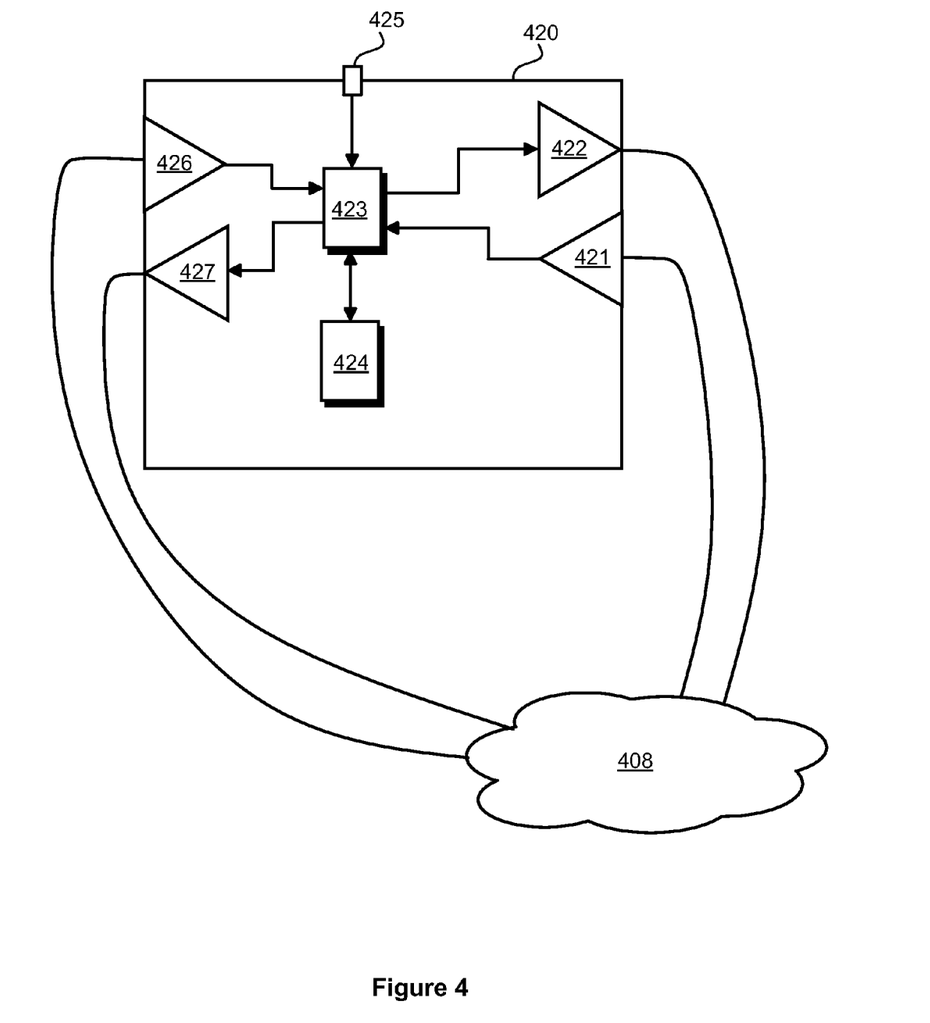
FIG. 4 shows a data transmission installation according to one embodiment of the invention for controlling the forwarding of data transmission frames.

FIG. 4 shows a data transmission installation 420 according to one embodiment of the invention for forwarding data transmission frames. The data transmission installation may function for example as the data transmission installation 207 shown in FIGS. 2a and 2b. The data transmission installation can be for example an IP (Internet Protocol) router, an MPLS (Multiprotocol Label Switching) switch, and/or an Ethernet switch. The data transmission installation includes data transmitters 422 and 427 for sending data transmission frames to a data transmission network 408. The data transmission frames can be for example IPv4 packets, IPv6 (Internet Protocol) packets or Ethernet frames. The data transmission installation is provided with a processor unit 423, which is adapted to:

write control data into one or more first data transmission frames to be sent to another data transmission installation, which control data contains building and cancelling commands for logical data transmission tunnels determined on the basis of the mobility of data terminals connected to the data transmission network 408, and write second control data into one or more second data transmission frames to be sent to said other data transmission installation, which control data contains location-related information updated on the basis of the mobility of said data terminals.

Said second control data enables selecting for a ring-shaped data transmission topology a data transfer direction which, according to a predetermined criterion, is preferred for carrying such a data transmission frame, which is addressed to one of said data terminals, to the commencing point of a logical data transmission tunnel directed to the discussed data terminal.

Said logical data transmission tunnels can be for example GTP-U (General Packet Radio Service Tunneling Protocol—User plane messages) data transmission tunnels, GRE (Generic Routing Encapsulation) data transmission tunnels, IPinIP (Internet Protocol in Internet Protocol) data transmission tunnels, or data transmission tunnels implemented by means of Ethernet frames.

The data transmission installation may also include a data storage 424 and/or a connecting interface 425 for linking with an external data storage. The processor unit 423 may consist of one or several processors, each of which can be for example a programmable processor, an application specific integrated circuit ASIC, a field programmable gate array FPGA, or a combination of one or more of the above.

The data transmission installation 420 according to one embodiment of the invention comprises data receivers 421 and 426 for receiving data transmission frames from said data transmission network. The processor unit 423 is adapted to read said data transmission frames for building and cancelling commands regarding said logical data transmission tunnels. Said data transmission frames may contain information transmitted by a mobility management entity (211, FIGS. 2a and 2b).

The data transmission installation 420 according to one embodiment of the invention includes a connecting interface 425, which enables linking the data transmission installation to the mobility management entity.

Figure 5:
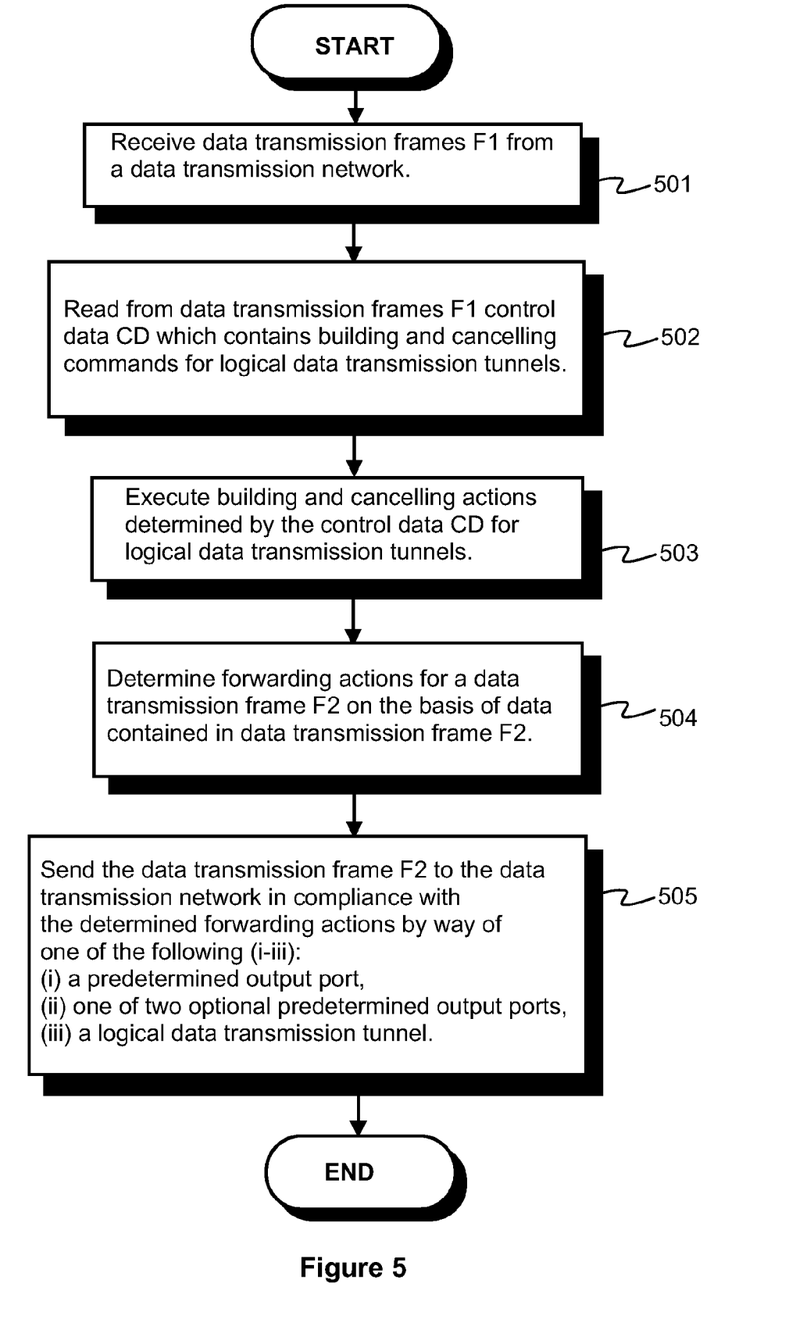
FIG. 5 shows in a flow chart a method according to one embodiment of the invention for forwarding data transmission frames.

FIG. 5 shows in a flow chart a method according to one embodiment of the invention for forwarding data transmission frames. Step 501 comprises receiving one or more first data transmission frames F1 in a data transmission installation from a data transmission network. Step 502 comprises reading control data CD from said one or more first data transmission frames F1, which control data contains building and cancelling commands for logical data transmission tunnels determined on the basis of the mobility of data terminals connected to said data transmission network. Step 503 comprises executing building and cancelling actions determined by said control data for logical data transmission tunnels. Step 504 comprises determining forwarding actions for a received second data transmission frame F2 on the basis of forwarding control data contained in said second data transmission frame F2. Said forwarding actions comprise a transmission of said second data transmission frame F2 to said data transmission network by way of one of the following (i-iii): (i) a predetermined output port of said data transmission installation or (ii) one of two optional predetermined output ports of said data transmission installation or (iii) a logical data transmission tunnel commencing from said data transmission installation. Step 505 comprises sending said second data transmission frame F2 to said data transmission network in compliance with the determined forwarding actions.

A method according to one embodiment of the invention comprises reading one or more third data transmission frames F3, received from said data transmission network, for second control data CD2 and selecting one of said two optional output ports on the basis of said second control data and the forwarding control data contained in said second data transmission frame F2.

A method according to one embodiment of the invention comprises selecting one of said two optional predetermined output ports on the basis of forwarding control data contained in said second data transmission frame F2 and one or more predefined conditions relevant to said forwarding control data.

A method according to one embodiment of the invention comprises reading second control data CD2 from one or more third data transmission frames F3 received from said data transmission network and primarily selecting one of said two optional predetermined output ports on the basis of said second control data CD2 and forwarding control data contained in said second data transmission frame F2, and secondarily selecting one of said two optional predetermined output ports on the basis of forwarding control data contained in said second data transmission frame F2 and one or more predefined conditions relevant to said forwarding control data.

A method according to one embodiment of the invention comprises writing third control data CD3 into one or more fourth data transmission frames F4 to be sent to said data transmission network, which control data is adapted to indicate one or more data terminals with a logical data transmission tunnel directed thereto commencing from said data transmission installation.

Said data transmission frames can be for example IPv4, IPv6 (Internet Protocol) packets or Ethernet frames. Said logical data transmission tunnels can be for example GTP-U (General Packet Radio Service Tunneling Protocol—User plane messages) data transmission tunnels, GRE (Generic Routing Encapsulation) data transmission tunnels, IPinIP (Internet Protocol in Internet Protocol) data transmission tunnels, or data transmission tunnels implemented by means of Ethernet frames. Said forwarding control data may contain for example an IP (Internet Protocol) destination address or an Ethernet destination address.

A method according to one embodiment of the invention comprises selecting, on the basis of forwarding control data for said second data transmission frame F2, one of the virtual data transmission networks predefined in said data transmission network. Each of said virtual data transmission networks can be for example an IP VPN (Internet Protocol, Virtual Private Network) virtual data transmission network or a VPLS (Virtual Private LAN Service) virtual data transmission network.

The method shown in FIG. 5 can be executed for example in the data transmission installation 204, the data transmission installation 205 and/or the data transmission installation 206 of the system illustrated in FIGS. 2a and 2b.

Figure 6:
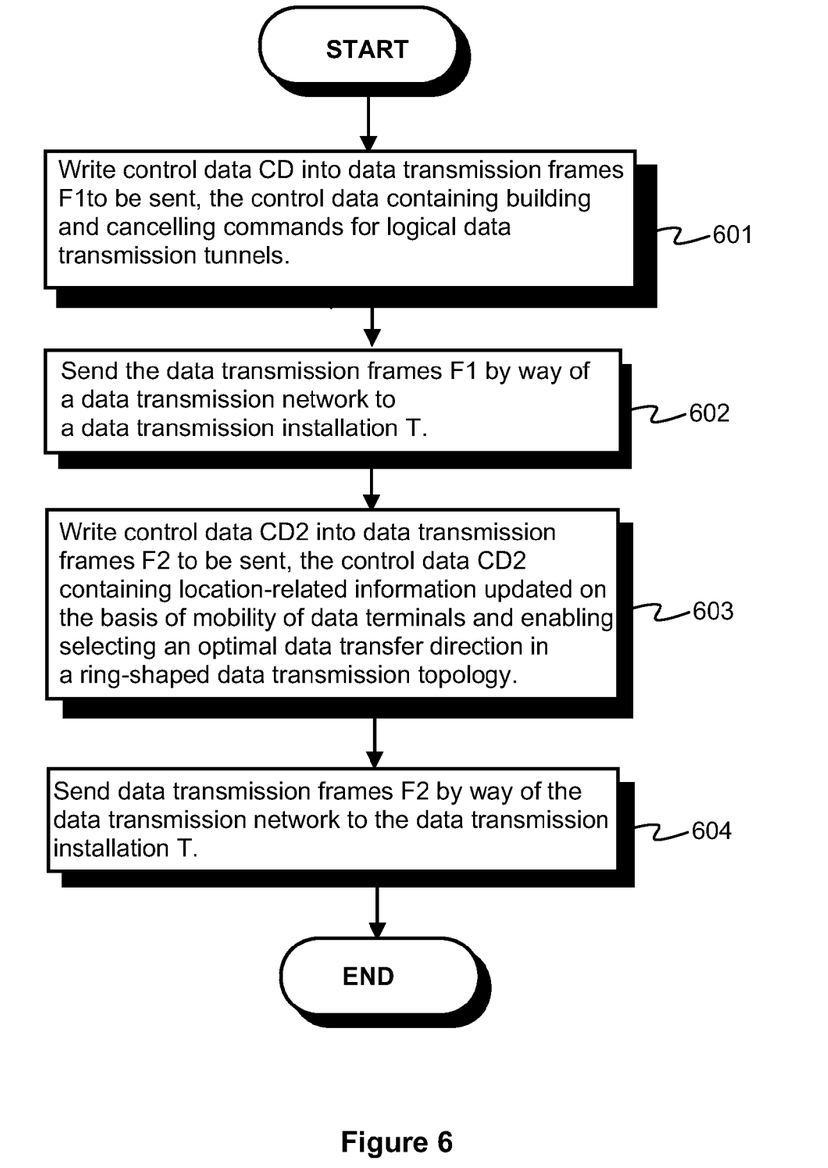
FIG. 6 shows in a flow chart a method according to one embodiment of the invention for controlling the forwarding of data transmission frames.

FIG. 6 shows in a flow chart a method according to one embodiment of the invention for controlling the forwarding of data transmission frames. Step 601 comprises writing control data CD into one or more first data transmission frames F1, which control data contains building and cancelling commands for logical data transmission tunnels determined on the basis of the mobility of data terminals connected to a data transmission network. Step 602 comprises sending said one or more first data transmission frames F1 by way of said data transmission network to a data transmission installation T included in a ring-shaped data transmission topology. Step 603 comprises writing second control data CD2 into one or more second data transmission frames F2, which control data contains location-related information updated on the basis of the mobility of said data terminals. Said second control data CD2 enables selecting a data transfer direction for said ring-shaped data transmission topology, which direction, according to a predetermined criterion, is preferred for carrying such a data transmission frame, which is addressed to one of said data terminals, to the commencing point of a logical data transmission tunnel directed to this particular data terminal. Step 604 comprises sending said one or more data transmission frames F2 by way of said data transmission network to said data transmission installation T.

Said data transmission frames can be for example IPv4, IPv6 (Internet Protocol) packets or Ethernet frames. Said logical data transmission tunnels can be for example GTP-U (General Packet Radio Service Tunneling Protocol—User plane messages) data transmission tunnels, GRE (Generic Routing Encapsulation) data transmission tunnels, IPinIP (Internet Protocol in Internet Protocol) data transmission tunnels, or data transmission tunnels implemented by means of Ethernet frames.

The method shown in FIG. 6 can be executed for example in the data transmission installation 207 included in the system shown in FIGS. 2a and 2b. In this case, said control data CD and said second control data CD2 are preferably transmitted to the data transmission installations 204, 205 and 206. It is also possible that each of the data transmission installations 204, 205 and 206 be only supplied with appropriate portions of said control data CD and said second control data CD2.

The computer program according to one embodiment of the invention for forwarding data transmission frames contains commands executable by a programmable processor unit for controlling said programmable processor unit so as to:
 read control data from one or more first data transmission frames received from a data transmission network, which control data contains building and cancelling commands for logical data transmission tunnels determined on the basis of the mobility of data terminals connected to a data transmission network,
 execute building and cancelling actions determined by said control data for logical data transmission tunnels, and
 determine forwarding actions for a received second data transmission frame on the basis of forwarding control data contained in said second data transmission frame, said forwarding actions comprising a transmission of said second data transmission frame by way of one of the following (i-iii): (i) a predetermined output port of a data transmission installation or (ii) one of two optional predetermined output ports of said data transmission installation or (iii) a logical data transmission tunnel commencing from said data transmission installation.

The foregoing computer program can be used for example in the data transmission installation 204, the data transmission installation 205 and/or the data transmission installation 206 included in the system shown in FIGS. 2a and 2b.

The computer program according to one embodiment of the invention for controlling the forwarding of data transmission frames contains commands executable by a programmable processor unit for controlling said programmable processor unit so as to:
 write control data into one or more first data transmission frames to be sent to a data transmission installation, which control data contains building and cancelling commands for logical data transmission tunnels determined on the basis of the mobility of data terminals connected to a data transmission network, and
 write second control data into one or more second data transmission frames to be sent to said data transmission installation, which control data contains location-related information updated on the basis of the mobility of said data terminals.

Said second control data enables selecting for a ring-shaped data transmission topology a data transfer direction which, according to a predetermined criterion, is preferred for carrying such a data transmission frame, which is addressed to one of said data terminals, to the commencing point of a logical data transmission tunnel directed to this particular data terminal.

The foregoing computer program can be used for example in the data transmission installation 207 included in the system shown in FIGS. 2a and 2b. In this case, said control data and said second control data are preferably transmitted to the data transmission installations 204, 205 and 206. It is also possible that each of the data transmission installations 204, 205 and 206 be only supplied with such portions of said control data and second control data which are appropriate for this particular data transmission installation.

The computer program according to one embodiment of the invention contains commands as described above, executable by a programmable processor unit, both for forwarding data transmission frames and for controlling the forwarding of data transmission frames. The computer program according to this embodiment of the invention can be used in the data transmission installations 204, 205, 206 and 207 included in the system shown in FIGS. 2a and 2b.

The computer program according to one embodiment of the invention is stored in a recording medium, such as for example in an optical disk (Compact Disk, CD), readable by a programmable processor unit.

A computer program according to one embodiment of the invention is encoded into a signal which is receivable from a data transmission network such as, for example, the Internet.

As obvious for a skilled artisan, the invention and its embodiments are not limited to the foregoing exemplary implementations. The expressions included in the claims for the presence of characterizing features, for example "the data transmission installation includes a processor unit" are open in the sense that the presentation of characterizing features does not exclude the presence of other such features that have not been presented in the independent or dependent claims.

What is claimed is:

1. A data transmission installation for forwarding data transmission frames, the data transmission installation comprising data receivers for receiving data transmission frames in the data transmission installation, data transmitters for sending data transmission frames from the data transmission installation, first and second output ports for connecting the data transmission installation to be a part of ring-shaped data transmission topology, and a processor unit adapted to:
 read control data from one or more received data transmission frames, the control data containing building and cancelling commands for logical data transmission tunnels determined on the basis of mobility of data terminals connected to a data transmission network,
 execute building and cancelling actions determined by the control data for logical data transmission tunnels, and
 determine forwarding actions for a received second data transmission frame on the basis of forwarding control data contained in the second data transmission frame, the forwarding actions being selected on the basis of the forwarding control data from a set comprising the following forwarding actions (i-iii): (i) a transmission of the second data transmission frame by way of the first output port, (ii) a transmission of the second data transmission frame by way of one of the first and second output ports, and (iii) a transmission of the second data transmission frame by way of a logical data transmission tunnel commencing from the data transmission installation.

2. The data transmission installation according to claim 1, wherein the processor unit is further adapted to read second control data from one or more received third data transmission frames and to select one of the first and second output ports on the basis of the second control data and forwarding control data contained in the second data transmission frame.

3. The data transmission installation according to claim 1, wherein the processor unit is further adapted to select one of the first and second output ports on the basis of forwarding control data contained in the second data transmission frame and one or more predefined conditions relevant to the forwarding control data.

4. The data transmission installation according to claim 1, wherein the processor unit is further adapted to read second control data from one or more received third data transmission frames and to select one of the first and second output ports on the basis of the second control data and forwarding control data contained in the second data transmission frame, and, in response to a situation in which the second control data does not fulfill predefined criteria, to select one of the first and second output ports on the basis of forwarding control data contained in the second data transmission frame and on the basis of one or more predefined conditions relevant to the forwarding control data.

5. The data transmission installation according to claim 1, wherein the processor unit is further adapted to write third control data into one or more fourth data transmission frames to be sent, which control data is adapted to indicate one or more data terminals with a logical data transmission tunnel directed thereto commencing from the data transmission installation.

6. The data transmission installation according to claim 1, wherein the processor unit is further adapted to support GTP-U (General Packet Radio Service Tunneling Protocol—User plane messages) data transmission tunnels.

7. The data transmission installation according to claim 1, wherein the processor unit is further adapted to support GRE (Generic Routing Encapsulation) data transmission tunnels.

8. The data transmission installation according to claim 1, wherein the processor unit is further adapted to support data transmission tunnels implemented by means of Ethernet frames.

9. The data transmission installation according to claim 1, wherein the processor unit is further adapted to support IPinIP (Internet Protocol in Internet Protocol) data transmission tunnels.

10. The data transmission installation according to claim 1, wherein the data transmission frames are IP (Internet Protocol) packets.

11. The data transmission installation according to claim 10, wherein the processor unit is further adapted to use an IP (Internet Protocol) destination address at least as part of the forwarding control data.

12. The data transmission installation according to claim 1, wherein the data transmission frames are Ethernet frames.

13. The data transmission installation according to claim 12, wherein the processor unit is further adapted to use an Ethernet destination address at least as part of the forwarding control data.

14. The data transmission installation according to claim 1, wherein the processor unit is further adapted to select, on the basis of forwarding control data for the second data transmission frame, one of the predefined virtual data transmission networks.

15. The data transmission installation according to claim 1, wherein the predefined virtual data transmission networks are IP VPN (Internet Protocol, Virtual Private Network) virtual data transmission networks.

16. The data transmission installation according to claim 1, wherein the predefined virtual data transmission networks are VPLS (Virtual Private LAN Service) virtual data transmission networks.

17. The data transmission installation according to claim 1, wherein the data transmission installation is at least one of the following: an IP (Internet Protocol) router, an MPLS (Multiprotocol Label Switching) switch, and an Ethernet switch.

18. A method for forwarding data transmission frames, the method comprising:
receiving one or more first data transmission frames in a data transmission installation,
reading control data from the one or more first data transmission frames, which control data contains building and cancelling commands for logical data transmission tunnels determined on the basis of mobility of data terminals connected to a data transmission network,
executing building and cancelling actions determined by the second control data for logical data transmission tunnels,
determining forwarding actions for a second received data transmission frame on the basis of forwarding control data contained in the second data transmission frame, the forwarding actions being selected on the basis of the forwarding control data from a set comprising the following forwarding actions (i-iii): (i) a transmission of the second data transmission frame by way of a first predetermined output port of the data transmission installation, (ii) a transmission of the second data transmission frame by way of one of the first predetermined output port and a second predetermined output port of the data transmission installation, and (iii) a transmission of the second data transmission frame by way of a logical data transmission tunnel commencing from the data transmission installation, the first and second predetermined output ports connecting the data transmission installation to be a part of a ring-shaped data transmission topology, and
sending the second transmission frame in compliance with the determined forwarding actions.

19. The method according to claim 18, wherein the method further comprises reading second control data from one or more received third data transmission frames and selecting one of the first and second predetermined output ports on the basis of the second control data and forwarding control data contained in the second data transmission frame.

20. The method according to claim 18, wherein the method further comprises selecting one of the first and second predetermined output ports on the basis of forwarding control data contained in the second data transmission frame and on the basis of one or more predefined conditions relevant to the forwarding control data.

21. The method according to claim 18, wherein the method further comprises reading second control data from one or more third data transmission frames and selecting one of the first and second predetermined output ports on the basis of the second control data and forwarding control data contained in the second data transmission frame, and, in response to a situation in which the second control data does not fulfill predetermined criteria, selecting one of the first and second predetermined output ports on the basis of forwarding control data contained in the second data transmission frame and on the basis of one or more predefined conditions relevant to the forwarding control data.

22. The method according to claim 18, wherein the method further comprises writing third control data into one or more fourth data transmission frames to be sent, which control data is adapted to indicate one or more data terminals with a logical data transmission tunnel directed thereto commencing from the data transmission installation.

23. The method according to claim 18, wherein the data transmission tunnels are GTP-U (General Packet Radio Service Tunneling Protocol—User plane messages) data transmission tunnels.

24. The method according to claim 18, wherein the data transmission tunnels are GRE (Generic Routing Encapsulation) data transmission tunnels.

25. The method according to claim 18, wherein the data transmission tunnels are implemented by means of Ethernet frames.

26. The method according to claim 18, wherein the data transmission tunnels are IPinIP (Internet Protocol in Internet Protocol) data transmission tunnels.

27. The method according to claim 18, wherein the data transmission frames are IP (Internet Protocol) packets.

28. The method according to claim 27, wherein the forwarding control data contains an IP (Internet Protocol) destination address.

29. The method according to claim 18, wherein the data transmission frames are Ethernet frames.

30. The method according to claim 29, wherein the forwarding control data contains an Ethernet destination address.

31. The method according to claim 18, wherein, on the basis of forwarding control data for the second data transmission frame, there is selected one of predefined virtual data transmission networks.

32. The method according to claim 31, wherein the predefined virtual data transmission networks are IP VPN (Internet Protocol, Virtual Private Network) virtual data transmission networks.

33. The method according to claim 31, wherein the predefined virtual data transmission networks are VPLS (Virtual Private LAN Service) virtual data transmission networks.

34. A non-transient computer readable medium storing a computer program including commands executable by a programmable processor unit for controlling the programmable processor unit to:

read control data from one or more received first data transmission frames, which control data contains building and cancelling commands for logical data transmission tunnels determined on the basis of mobility of data terminals connected to a data transmission network, execute building and cancelling actions determined by the control data for logical data transmission tunnels, determine forwarding actions for a received second data transmission frame on the basis of forwarding control data contained in the second data transmission frame, the forwarding actions being selected on the basis of the forwarding control data from a set comprising the following forwarding actions (i-iii): (i) a transmission of the second data transmission frame by way of a first predetermined output port of a data transmission installation, (ii) a transmission of the second data transmission frame by way of one of the first predetermined output port and a second predetermined output port of the data transmission installation, and (iii) a transmission of the second data transmission frame by way of a logical data transmission tunnel commencing from the data transmission installation, the first and second predetermined output ports connecting the data transmission installation to be a part of a ring-shaped transmission topology.

35. The non-transient computer readable medium according to claim 34, wherein the computer program further includes commands executable by a programmable processor unit for controlling the programmable processor unit so as to:

write the control data into one or more third data transmission frames to be sent, and write second control data into one or more fourth data transmission frames to be sent, the second control data containing location-related information, which is updated on the basis of the mobility of the data terminals and which enables selecting for the ring-shaped data transmission topology a data transfer direction which, according to a predetermined criterion, is more advantageous for carrying a fifth data transmission frame, which is addressed to one of the data terminals, to the commencing point of a logical data transmission tunnel directed to this particular data terminal.

36. The non-transient computer readable medium according to claim 34, wherein the computer program is stored in a recording medium.

37. The non-transient computer readable medium according to claim 34, wherein the computer program is encoded in a signal which is receivable from a data transmission network.

\* \* \* \* \*